United States Patent
Oztaskent et al.

(10) Patent No.: US 8,510,770 B1
(45) Date of Patent: Aug. 13, 2013

(54) PREDICTING LIVE PROGRAMS

(75) Inventors: Ant Oztaskent, Sutton (GB); Yaroslav Volovich, Cambridge (GB); Simon Michael Rowe, Finchampstead (GB)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/365,860

(22) Filed: Feb. 3, 2012

(51) Int. Cl.
*H04H 60/32* (2008.01)
*G06Q 99/00* (2006.01)
*G06F 15/16* (2006.01)
*H04N 21/658* (2011.01)
*H04H 60/56* (2008.01)
*H04N 7/173* (2011.01)
*G06Q 50/00* (2012.01)
*H04L 29/08* (2006.01)

(52) U.S. Cl.
CPC .......... *H04N 21/6582* (2013.01); *H04H 60/56* (2013.01); *H04N 7/173* (2013.01); *G06Q 50/01* (2013.01); *H04L 29/08072* (2013.01)
USPC ............. 725/21; 705/319; 709/201; 709/217; 709/223

(58) Field of Classification Search
USPC ................... 725/21; 705/319; 709/201–207, 709/217–219, 223–224
See application file for complete search history.

(56) References Cited

U.S. PATENT DOCUMENTS

| | | | | |
|---|---|---|---|---|
| 7,117,518 B1 * | 10/2006 | Takahashi et al. | .............. | 725/86 |
| 7,343,616 B1 * | 3/2008 | Takahashi et al. | .............. | 725/46 |
| 7,962,935 B2 * | 6/2011 | Kurosaki et al. | ................ | 725/40 |
| 2002/0056087 A1 * | 5/2002 | Berezowski et al. | ............. | 725/9 |
| 2003/0145319 A1 * | 7/2003 | Sato | ................. | 725/14 |
| 2005/0149964 A1 * | 7/2005 | Thomas et al. | .................... | 725/9 |
| 2006/0136965 A1 * | 6/2006 | Ellis et al. | ........................ | 725/46 |
| 2007/0136753 A1 * | 6/2007 | Bovenschulte et al. | ......... | 725/46 |
| 2007/0143778 A1 * | 6/2007 | Covell et al. | .................... | 725/19 |
| 2007/0294729 A1 | 12/2007 | Ramaswamy | | |
| 2007/0294740 A1 * | 12/2007 | Drake et al. | .................. | 725/131 |
| 2009/0147786 A1 * | 6/2009 | Li et al. | ......................... | 370/390 |
| 2010/0205628 A1 | 8/2010 | Davis et al. | | |
| 2011/0029636 A1 | 2/2011 | Smyth et al. | | |
| 2012/0124620 A1 * | 5/2012 | Nishizawa et al. | ............. | 725/34 |

OTHER PUBLICATIONS

Brown, Tweet and sour moods, Los Angeles Times, Sep. 30, 2011.*

(Continued)

*Primary Examiner* — Nasser Goodarzi
*Assistant Examiner* — Michael B Pierorazio
(74) *Attorney, Agent, or Firm* — Foley & Lardner LLP; John D. Lanza (57) ABSTRACT

Systems and methods for predicting whether a program will be watched live, including receiving a plurality of message posts relating to the program; determining, from the plurality of message posts, a number of live message posts for the program based on a number of message posts relating to the program posted within a first predetermined time frame relative to the live playing of the program; determining a number of other message posts for the program based on a number of message posts relating to each program posted within a second predetermined time frame different from the first predetermined time frame; determining a first ratio based on the number of live message posts and the number of other message posts for the program; determining whether the program was predominantly watched live based on the first ratio; predicting whether the program will be watched live based on the determination; and recording the prediction in an electronic programming guide.

5 Claims, 2 Drawing Sheets

(56) References Cited

OTHER PUBLICATIONS

Wakamiya et al., "Towards Better TV Viewing Rates: Exploiting Crowd's Media Life Logs over Twitter for TV Rating", Social and Behavioral Sciences, Feb. 21-23, 2011, 10 pages.

Xu et al., "Live Sports Event Detection Based on Broadcast Video and Web-casting Text", Institute for Infocomm Research, Oct. 23-27, 2006, pp. 221-230.

\* cited by examiner

PREDICTING LIVE PROGRAMS

BACKGROUND

The present disclosure relates generally to electronic programming guides and more particularly, to predicting live programs based on activity relating to the programs.

SUMMARY

Implementations of the systems and methods for predicting live programs are described herein. One implementation is a method for predicting whether a program will be watched live. The method may include receiving, at a server, a plurality of message posts relating to the program. The method may also include determining, from the plurality of message posts, a number of live message posts for the program based on a number of message posts relating to the program posted within a first predetermined time frame relative to the live playing of the program. The method may yet further include determining a number of other message posts for the program based on a number of message posts relating to each program posted within a second predetermined time frame different from the first predetermined time frame. The method may also include determining a first ratio based on the number of live message posts and the number of other message posts for the program. The method may include determining whether the program was predominantly watched live based on the first ratio. The method may also include predicting whether the program will be watched live based on the determination. The method may include recording the prediction in an electronic programming guide.

Another implementation is a method for predicting programs that will be watched live. The method may include receiving, at a server, program data relating to a plurality of programs. The method may also include using the program data for each of the programs for determining a number of live views for each program based on the number of views during the live broadcast. The method may further include determining a number of recorded views for each program based on the number of views commencing after the start of the live broadcast. The method may include determining a first ratio for each program based on the number of live views to the sum of the number of live views and recorded views. The method may also include determining an average ratio for the programs based on ratio of the live views to the sums of views. The method may further include comparing the first ratio of each program to the average ratio of all programs. The method may include predicting one of the plurality of programs will be watched live based on the comparison.

Another implementation is a system for predicting whether a program will be watched live. The system may include a tangible computer-readable storage device comprising instructions; and one or more processors coupled to the tangible computer-readable storage device and configured to execute the instructions to perform operations. The operations may include receiving, at a server, a plurality of message posts relating to the program. The operations may further include determining, from the plurality of message posts, a number of live message posts for the program based on a number of message posts relating to the program posted within a first predetermined time frame relative to the live playing of the program. The operations may also include determining a number of other message posts for the program based on a number of message posts relating to each program posted within a second predetermined time frame different from the first predetermined time frame. The method may yet further include determining a first ratio based on the number of live message posts and the number of other message posts for the program. The method may also include determining whether the program was predominantly watched live based on the first ratio. The method may include predicting whether the program will be watched live based on the determination. The method may also include recording the prediction in an electronic programming guide.

DETAILED DESCRIPTION

According to some implementations, the ability to determine whether a program will be "watched live" may be useful to subscribers to help them determine which programs to view. "Watched live" programs may be programs that viewers prefer watching as they are being broadcast, rather than viewing a DVR'd version or a previously-recorded online streaming version. These programs may include talent shows where viewer engagement (e.g., live voting, etc.) is encouraged, highly-popular series where viewing the program later could result in spoilers, live sporting events, live news, etc. For example, the program may be an episode in a television series that has a continuing plot that unfolds in a sequential episode by episode fashion. Thus, if the first episode is determined to be watched live, then the next episode in the series will be determined to be "live." In some implementations, the electronic programming guide (EPG) may denote the other episodes as "live" to allow the user to determine whether to watch during the airing time.

According to some implementations, the ability to determine whether a program is "watched live" may be useful to content providers to help them understand the viewership of the program as well as to determine the correct time slot for the program. According to other implementations, the ability to determine whether a program will be "watched live" may be useful to advertisers to determine how to allocate their advertising budgets.

Figure 1:
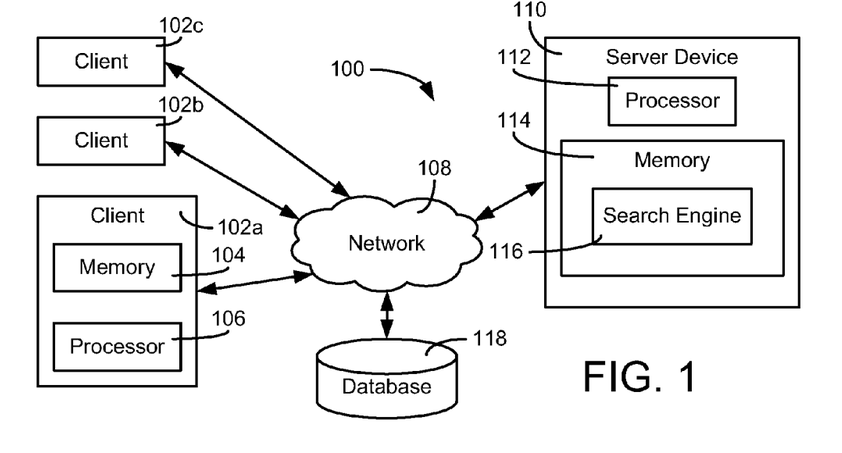
FIG. 1 is a block diagram of a system in accordance with a described implementation.

Referring to FIG. 1, a block diagram of a system in accordance with a described implementation, is shown. System 100 shown in FIG. 1 includes an architecture having multiple clients 102a-102c in communication with server 110 over network 108. In some implementations, there are multiple servers that perform the functions of the single server in FIG. 1. The network shown includes the Internet. In other implementations, other networks, such as a WAN, LAN, or intranet may be used. In some implementations, system 100 and methods may operate within a single server. In a brief overview, clients 102a-c and server 110 may be remote from each other. The relationship of client 102a-c and server 110 arise by virtue of programs running on the respective device and having a client-server relationship to each other. In some implementations, server 110 provides data (e.g., an HTML page) to clients 102a-c (e.g., for purposes of displaying data to and receiving user input from a user interacting with the client). Data generated at clients 102a-c (e.g., a result of the user interaction) can be received from client 102a-c at server 110.

Clients 102a-102c each include a processor 106 and a memory 104. Processor 106 executes program instructions stored in memory 104. Processors 106 may include a microprocessor, ASIC, FPGA, state machines, etc. Memory 104 may include, but is not limited to, electronic, optical, magnetic, or any other storage or transmission device capable of providing a processor with program instructions. Memory 104 may further include a floppy disk, CD-ROM, DVD, magnetic disk, memory chip, ASIC, FPGA, ROM, RAM, EEPROM, EPROM, flash memory, optical media, or any other suitable memory from which a processor can read instructions. The instructions may include code from any suitable computer-programming language, such as, but not limited to, C, C++, C#, Go, Java, JavaScript, Perl, Python and Visual Basic.

Clients 102a-102c may also have a number of external or internal devices such as a mouse, a CD-ROM, DVD, a keyboard, a display, or other input or output devices. Examples of clients 102a-102c are personal computers, digital assistants, personal digital assistants, cellular phones, mobile phones, smart phones, pagers, digital tablets, laptop computers, Internet appliances, and other processor-based devices. In general, clients 102a-102c may be any type of processor-based platform that is connected to a network 108 and that interacts with one or more applications. Clients 102a-102c may operate on any operating system capable of supporting a browser or browser-enabled application, such as Linux, Mac OS, Windows, etc. Clients 102a-102c shown include, for example, personal computers executing a browser application program, such as Apple Computer, Inc.'s Safari, Microsoft Corporation's Internet Explorer, Mozilla's Firefox, Netscape Communication Corporation's Netscape Navigator, and Opera Software's Opera.

As shown in FIG. 1, server 110 is also coupled to network 108. Server 110 may include processor 112 and memory 114 executing search engine 120 system. Similar to clients 102a-c, server 110 shown in FIG. 1 includes processor or processing circuit 112 having a memory. Server 110 may be implemented as a network of computer processors. In some implementations, server 110 may be multiple servers, mainframe computers, networked computers, a processor-based device, and similar types of systems and devices.

Server 110 may include a search engine system ("search engine"). In some implementations, the search engine may include multiple systems, including, but not limited to, a crawler to retrieve data, a processor, an index engine, and an interface to receive data from the index engine to format and provide the data to a client. In some implementations, server 110 can include a related information server, advertising server, etc. Server 110 may access network 108 to receive program data, subtitles, etc., from other devices or systems connected to the network 108.

Memory 114 includes search engine 120. Search engine 120 may locate relevant information from network 108 in response to a search query from a user, from a program, etc. The query may include a plurality of keywords. The query may also include one or more images and keywords that are based on the image. The query may include streaming content. Search engine 120 may also maintain a search log of the search queries. Search engine 120 may provide a search result set to a user, a program, etc., via network 108.

In some implementations, server 110 may communicate with network 108 to access database 122. Database 122 may include a set of stored rules. The set of stored rules may be used determine whether a program is being watched live. Database 122 may include source identifiers. The source identifiers may be used to determine the source of the program. Database 122 may also include viewer-specific data. For example, the viewer-specific data may include viewer profile data, viewer mobile application data, viewer preference data, etc.

In some implementations, the programs may be provided to system 100 by an application operating on a computing device. In some implementations, the device may include DVR, DVD, Google TV, (e.g., a set-top box (STB), an integrated internet television device, etc.), and any other appropriate computing device. The program may include streaming content, webpage/website content, video content, etc.

The features disclosed herein may be implemented on a smart television module (or connected television module, hybrid television module, etc.), which may include a processing circuit configured to integrate internet connectivity with more traditional television programming sources (e.g., received via cable, satellite, over-the-air, or other signals). The smart television module may be physically incorporated into a television set or may include a separate device such as a set-top box (STB), Blu-ray or other digital media player, game console, hotel television system, and other companion device. A smart television module may be configured to allow viewers to search and find videos, movies, photos and other content on the web, on a local cable TV channel, on a satellite TV channel, or stored on a local hard drive. A STB or set-top unit (STU) may include an information appliance device that may contain a tuner and connect to a television set and an external source of signal, turning the signal into content, which is then displayed on the television screen or other display device.

A smart television module may be configured to provide a home screen or top level screen including icons for a plurality of different applications, such as a web browser and a plurality of streaming media services (e.g., Netflix, Vudu, Hulu, etc.), a connected cable or satellite media source, other web "channels," etc. The smart television module may further be configured to provide an electronic programming guide to the user. A companion application to the smart television module may be operable on a mobile computing device to provide additional information about available programs to a user, to allow the user to control the smart television module, etc. In alternate embodiments, the features may be implemented on a laptop computer or other personal computer, a smartphone or other mobile phone or handheld computer, a tablet PC, or other computing device.

Other systems and architectures may be implemented to carry out the present disclosure other than what is shown in FIG. 1. It may be possible to carry out the operations offline.

Figure 2:
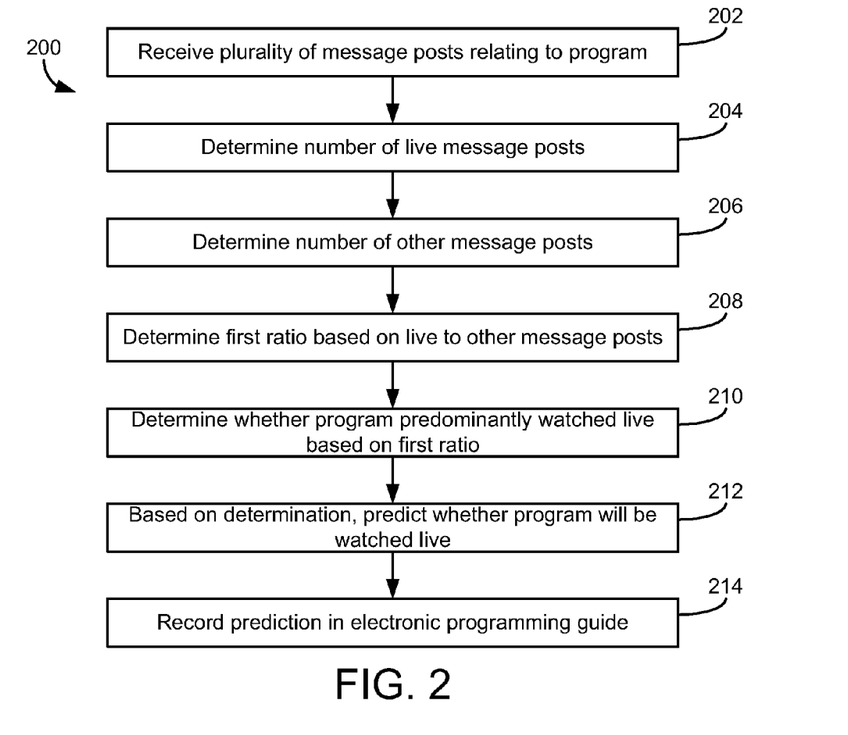
FIG. 2 is a flow diagram of a method in accordance with a described implementation.

Referring to FIG. 2, a flow diagram of a method for predicting whether a program will be watched live is shown in accordance with a described implementation. Method 200 is provided by way of example, as there are a number of ways to carry out the methods according to the present disclosure. Method 200 shown in FIG. 2 may be executed or otherwise performed by one of a combination of various systems. Method 200 may be implemented by a computer, a computer program product, a client, a server, a client-server relationship, etc. Method 200 is described herein as carried out by system 100 of FIG. 1, by way of example.

The example method begins at block 202, in which a plurality of message posts are received. In some implementations, the plurality of message posts may be received in real time. For example, the message posts are received as a program is being viewed. In other implementations, the message posts may be received after a program has been viewed. The plurality of message posts may be stored for retrieval at a later period.

In some implementations, the system may retrieve an electronic programming guide (EPG). The electronic programming guide may include data related to what was broadcast on all channels N days prior to the present date of the program. The EPG may also include data related to what is scheduled to be broadcast on all channels at the present data and/or in the next N hours.

The EPG may include program data, such as, but not limited to, names of the programs, the channel name, number or other appropriate identifier, a media network broadcasting the show, etc. The electronic programming guide may include viewership data. In some implementations, viewership data includes ratings for a previous episode of the program. In some implementations, viewership data includes, but is not limited to, viewership patterns, viewership locations, and viewership audience (e.g., total number of viewers).

Viewership patterns may include, but are not limited to, viewing history, viewer preferences (e.g., genre, time slots, viewer-denoted preferences, etc.), search history, program recording history, saved programs, etc. Viewership locations may include, but are not limited to, physical location (e.g., region, country, etc.), application location (e.g., computer, mobile phone, etc.), medium (e.g., television, Internet, hybrid medium, etc.), etc. Viewership audience may include, but is not limited to, demographic information (e.g., age, gender, etc.), social networking groups (e.g., family, friends, co-workers, etc.), affinity groups (e.g., based on category), etc.

At block 204, a number of live message posts from the plurality of message posts is determined based on a number of message posts relating to the program posted within a first predetermined time frame relative to the live playing of the respective program. In some implementations, the number of message posts may include social networking posts, publisher web page posts made to a web page of a web site for publishing web content, Internet posts, text messages sent over a short message service, etc. In some implementations, message posts may include microposts (e.g., short, topical posts on a social networking website, may be around 128 characters or less) relating to all programs in the last N days.

In some implementations, the number of message posts may be determined and/or updated in real-time. For example, message posts may be received, determined, updated, etc. as the program is being viewed. In another example, message posts are received, determined, updated as the user/operator/entity provides message posts related to the program data.

The first predetermined time frame may be determined by system 100. In some implementations, system 100 determines a number of live message posts about the program that were posted during +/–M minutes of the airing of the program. In some implementations, system 100 determines a number of posts about the program that were posted right before an airing of the program, e.g., in the P minutes preceding the program. The first predetermined time frame may be any appropriate time frame for system 100 to determine the number of live message posts.

For example, when users post messages, they include direct or indirect references to the program, e.g., program data, including but not limited to, program title, actor names, character names, hash-tag, channel name, etc. The user may also quote what was said in the program, e.g., "Actor Martin was just brilliant! LOL," which is a reference to an actor or "Sports Team X go! go!," which is a reference to a sports team. The system may assign scores that reflect how well a given post relates to a particular program. The higher the score, the higher the probability that the particular message is relevant. The sum of all scores gives a final score may factor into the prediction whether a program or subsequent episode will be watched live.

Posts may be associated with a program based on several factors. For example, the post may include the program name, such as "watching I-factor and loving it." In another example, the post may be received from a hashtag enhanced program (e.g., users may include a particular hashtag in their posts, such as #hignfy ("Have I got news for you"). Posts may also be provided via an EPG enhanced application, e.g., a second screen application from which some of the microposts may originate.

When a user uses this second screen application to create and post a message about a program the user is viewing and/or interacting, the application provides the user with the option to manually select the channel they are currently watching, or it automatically detects which channel the user is watching by audio-fingerprint matching. Once the channel is known, the system looks up the unique identifier for the program currently airing on that channel from an EPG database. The system then associates a program identifier to the user's message post, micropost, etc. The associated program identifier may not be a human-readable value, and although the message post and/or micropost record stored in the system may include this value, it may not be displayed to a user. When locating message posts and/or microposts related to a program, the system may infer with 100% confidence that a message post and/or micropost which has the "associated program identifier" value is related to that specific program.

In another example, the second screen application may include a user interface where the user may explicitly select the program to which the post relates to. In this example, the association between the post and the program is 100 percent deterministic.

At block 206, a number of other message posts from the plurality of message posts is determined, based on a number of message posts relating to the program posted within a second predetermined time frame substantially outside of the first predetermined time frame.

The second predetermined time frame may be determined by system 100. In some implementations, system 100 may determine other message posts about the program that were posted at any time in the last N days. The second predetermined time frame may be any appropriate time frame for system 100 to determine the number of other message posts that are not live message posts. The "first predetermined time frame" may be the program airing time (+/– some time). The "second predetermined time frame" may be some other (typically longer) time frame from which the usual/average number of microposts related to that program may be determined.

For example, for very topical programs, e.g., a talent show, the first predetermined time frame may be 30 minutes while the second predetermined time frame may be 2 hours. In another example, for the program: The Swimming Pool, the airing time is 9:00 PM ET on December 8 to 9:30 PM ET on December 8. The first predetermined time frame may be 8:55 PM ET on December 8 to 9:40 PM ET on December 8. The second predetermined time frame may be 8:55 PM ET on December 7 to 8:55 PM ET on December 8. In some implementations, the second predetermined time frame does not overlap the first predetermined time frame by more than four minutes. Other variations of the time frames may be implemented.

The first and second predetermined time frames may also be adjusted due to multiple time zones meaning the same program may be aired at different times in different regions in the US. For example, the above program would be aired at 9:00 PM ET in New York, but would be aired at 9:00 PM PT (equivalent to 12:00 AM ET) in Los Angeles. For such programs, the system may have multiple "first predetermined time frame" and "second predetermined time frame" values for the same program. In these cases, the message posts and/or microposts included in the ratio calculation may be only from those users known to reside in the area covered by the broadcast. If the user, message post or micropost does not have location information, the message post or micropost may be excluded from the calculation. For example, the ratio calculation that uses the 9:00 PM PT airing time of the above program may only include message posts or microposts from users living in areas of the US that are in the Pacific Time zone.

At block 208, a first ratio based on the number of live message posts and the number of other message posts for the program is determined. In some implementations, the ratio may be stored in a memory for the program. For example, the system may be configured to calculate a ratio of live message posts to the sum of live message posts and other (non-live) message posts. Other ratios can be used. Some message posts may be weighted more heavily in some ratio calculations, for example based on a reliability score associated with the source of the message posts (e.g., message posts from a web site devoted to the program may weigh more heavily than message posts from a web site unrelated to the program).

At block 210, a determination is made as to whether the program was predominantly watched live based on the first ratio. For example, the ratio of live to total posts (e.g., sum of live and non-live posts) may be determined for a previous week (e.g., previous to the showing of one particular program being evaluated) and compared against the ratio of live to total posts for a different time period. In another example, a program for which more than N (or N %) of the viewing occurs during its original airing. In some implementations, N is 90% or 0.9. In other implementations, N may be 50% (0.5), 60% (0.6), 70% (0.7), 75% (0.75), etc.

In some implementations, the deviation of the ratio of live to total posts may be statistically significant to cause an inference that the program was watched live and to make a prediction that the program will be watched live; the statistical significance may be determined by system 100 comparing the deviation to a predetermined threshold and determining based on the comparison whether the program was watched live to make a prediction that the program will be watched live.

In some implementations, an average ratio for the programs of the EPG is determined. The average ratio may be based on ratios of the live message posts to the sums of message posts for the programs. In some implementations, the average ratio may be determined for all of the programs after the ratio for each program is determined. In some implementations, the average ratio may be stored in a memory. In some implementations, a clustering algorithm (such as K-means) may be applied to the average duration and determine if the algorithm may select the non-live and live programs.

In some implementations, the ratio for each program may be compared to the average ratio for all programs of the EPG. In some implementations, the ratio for each program may deviate from the average ratio for all programs. The deviation may be statistically significant, i.e., there may be some measure of difference between the ratio for each program and the average ratio of all programs to cause an inference that the program was watched live. In some implementations, the comparison of the first ratio and the average ratio may be implemented in real time. For example, if a program is live and the first ratio is compared to the average ratio, then the program is delineated "live" in real time. In some implementations, the threshold for the prediction that the program will be watched live could be that the rate of message posts within in the last 30 minutes has been more than the 99th-percentile rate in the last 3 days, or else more than 3 times the average rate for the last day.

At block 212, based on the determination that the program was predominantly watched live, a prediction is made as to whether the program will be watched live. For example, if an episode 1 of a 12-episode series is predominantly watched live, then this program will be flagged within the EPG for episode 2 as a candidate to be watched live.

At block 214, the prediction is recorded in the EPG. The EPG may include indicia that the program will be watched live. In some implementations, system 100 delineates each program as having been watched live or not watched live. In some implementations, system 100 highlights, bolds, annotates, or uses other appropriate methods to delineate that the program will be watched live. In some implementations, system 100 scans the EPG and delineates future episodes of the program as a candidate for being watched live. For example, as described above, if episode 1 was predominantly watched live, then episode 2 will be marked as "candidate to be watched live" in the EPG. As described herein, the predictions may be altered within the EPG based on further iterations of method 200. For example, if episode 2 is determined to not be watched live, then episode 3 may be marked as a "potential candidate to be watched live," "unlikely to be watched live," etc. The delineation of watched live programs may be stored in a memory and provided to a user in response to a request.

In some implementations, system 100 may run periodically, e.g., every day, to predict which programs will be watched live. One or more blocks shown and described in the flow diagrams herein may run periodically, e.g., regular time periods. In other implementations, the system may run intermittently, e.g., random time periods. The time period that the system runs may be determined by a user, an entity, the system, etc. In some implementations, system 100 may parse program information for the previous N days and extract all program information relating to the programs that aired in the last N days.

Figure 3:
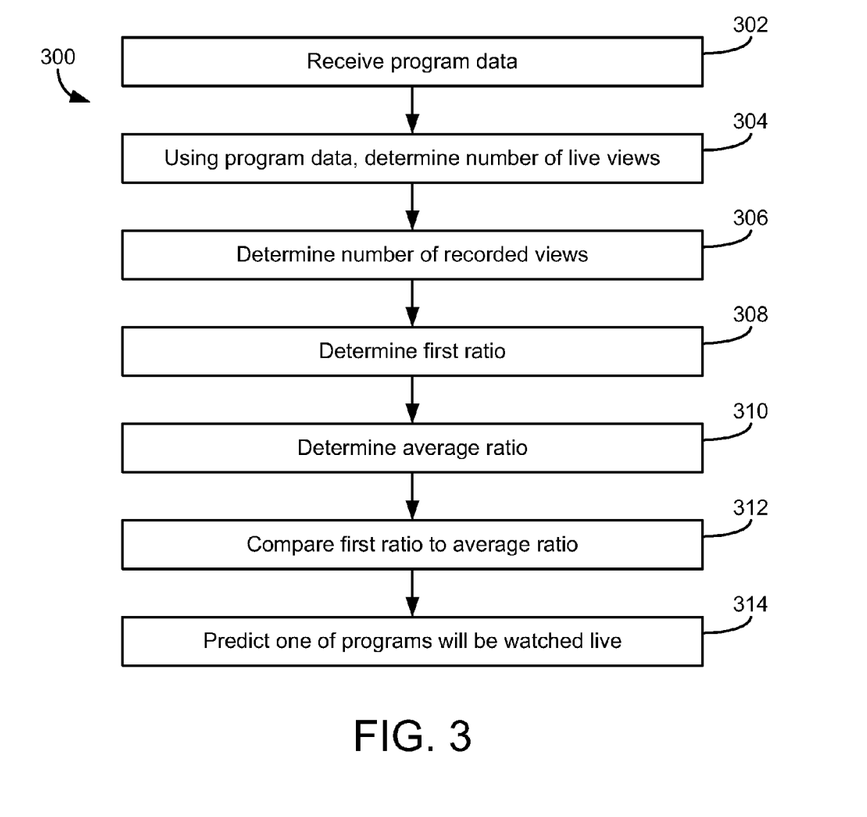
FIG. 3 is a flow diagram of a method in accordance with a described implementation.

Referring to FIG. 3, a flow diagram of a method for predicting programs that will be watched live is shown in accordance with a described implementation. Method 300 is provided by way of example, as there are a number of ways to carry out the methods according to the present disclosure. Method 300 shown in FIG. 3 may be executed or otherwise performed by one of a combination of various systems. Method 300 may be implemented by a computer, a computer program product, a client, a server, a client-server relationship, etc. Method 300 is described herein as carried out by system 100 of FIG. 1, by way of example.

The example method begins at block 302, in which program data relating to a plurality of programs viewed by a user is received. The program data may include a number of views of each program during a live broadcast. The program data may also include a number of recorded views of each program. The program data may include viewership data from previous episodes of the plurality of programs. The program data may also include viewership data related to all upcoming (i.e., future) programs. It may be determined that the program is live or recorded based on if the user is viewing the program at the time denoted in the EPG or at another later time.

At block 304, the program data for each of the programs is used for determining a number of live views for each program based on the number of views during the live broadcast. System 100 may determine the number of units (e.g., persons, devices, etc.) that were tuned in during the program's original air time. In some implementations, system 100 may determine a live view as a view within X amount of time after the program commences. For example, for a 30 minute broadcast, a viewer that tunes in within the first 10 minutes is considered a "live view." System 100 may store the amount of live views for each program in a memory. In some implementations, system 100 may erase the stored data after a determination of the program's status (e.g., live, recorded, etc.) is made, after a set period of time, etc. The user may opt out of this type of monitoring, or the system may allow the user to opt-in to the monitoring before any monitoring begins.

At block 306, the program data for each of the programs is used for determining a number of recorded views for each program based on the number of views commencing after the start of the live broadcast. System 100 may calculate the number of units (e.g., persons, devices, etc.) that engaged in time-shifted viewing, pre-recorded viewing, Internet viewing, other appropriate time-shifted arrangements, etc. For example, system 100 may determine the number of units that viewed the program during the following X days after the program's original air time. System 100 may store the amount of recorded views for each program in a memory. In some implementations, system 100 may erase the stored data after a determination of the program's status (e.g., live, recorded, etc.) is made, after a set period of time, etc.

At block 308, the program data for each of the programs is used for determining a first ratio for each program based on the number of live views to the sum of the number of live views and recorded views. The relationship conveyed by the first ratio may provide system 100 with a semblance of the proportion of live views of each program.

At block 310, an average ratio based on live views to sums of views for the plurality of programs is determined. The relationship conveyed by the average ratio may provide system 100 with a semblance of the proportion of live views for all of the programs. In some implementations, the average ratio may be determined for all of the programs after the ratio for each program is determined. In some implementations, the average ratio may be stored in a memory.

At block 312, the first ratio is compared to the average ratio. In some implementations, the first ratio may deviate from the average ratio. The deviation may be statistically significant, i.e., there is some measure of difference between the first ratio and the average ratio to cause an inference that the program was watched live. In some implementations, the deviation may be statistically significant if it is more than two standard deviations from the mean, e.g., the p-value is lower than a specific threshold, such as 5 percent.

At block 314, one of the plurality of programs is predicted to be watched live based on the comparison. In some implementations, the deviation may be statistically significant or meet a predetermined threshold to cause an inference that the program was watched live. The statistical significance may be determined by system 100. For example, more than 50% of television households within 1 week watched the program, therefore the program is predicted to be watched live during the next airing. In some implementations, other percentages may be applicable, such as more than 75%, 80%, 85% or 90%.

In some implementations, system 100 delineates the program as having been watched live. In some implementations, system 100 highlights, bolds, annotates, or other appropriate methods to delineate that the program was watched live within the electronic programming guide. In some implementations, system 100 scans future program data and delineates future episodes of the program as a candidate for being watched live. The system may also scan upcoming programs and report upcoming programs as candidates for being watched live. The delineation of programs may be stored in a memory.

Implementations of the subject matter and the operations described in this specification can be implemented in digital electronic circuitry, or in firmware, software embodied on a tangible medium, or hardware, including the structures disclosed in this specification and their structural equivalents, or in combinations of one or more of them. Implementations of the subject matter described in this specification can be implemented as one or more computer programs, i.e., one or more modules of computer program instructions, encoded on one or more computer storage medium for execution by, or to control the operation of, data processing apparatus. Alternatively, or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, or other storage devices). Accordingly, the computer storage medium is both tangible and non-transitory.

The operations described in this specification can be implemented as operations performed by a data processing apparatus on data stored on one or more computer-readable storage devices or received from other sources.

The term "client or "server" includes all kinds of apparatus, devices, and machines for processing data, including by way of example, a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example, semiconductor memory devices, e.g., EPROM, EEPROM, flash memory devices, and magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), LCD (liquid crystal display), OLED (organic light emitting diode), TFT (thin-film transistor), or other flexible configuration, or any other monitor for displaying information to the user and a keyboard, a pointing device, e.g., a mouse, trackball, etc., or a touch screen, touch pad, etc., by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of server 110 can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While this specification contains many specific implementation details, these should not be construed as limitations on the scope of any disclosures or of what may be claimed, but rather as descriptions of features specific to particular implementations of particular disclosures. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method for predicting whether a program will be watched live, comprising:
    receiving, at a server, a plurality of social networking message posts relating to the program in an electronic programming guide;
    determining, from the plurality of social networking message posts, a number of live social networking message posts for the program based on a number of social networking message posts relating to the program posted within a first predetermined time frame prior to or during the live playing of the program;
    determining, from the plurality of message posts, a number of other social networking message posts for the program based on a number of social networking message posts relating to each program posted within a second predetermined time frame substantially outside of the first predetermined time frame, wherein the second predetermined time frame is after the live playing of the program;
    determining a first ratio based on the number of live social networking message posts and the number of other social networking message posts for the program, wherein the number of live or the number of other social networking message posts from a website related to the program are weighted more heavily in the first ratio than the number of live or the number of other social networking message posts from a website unrelated to the program;

storing the first ratio in a memory;

determining an average ratio based on the number of live social networking message posts and the number of other social networking message posts for all programs in the electronic programming guide;

retrieving the first ratio from the memory and comparing the first ratio of the program to the average ratio of all of the programs in the electronic programming guide;

determining whether the program was predominantly watched live, rather than watched as a digital video recorded version or watched as an online streaming recorded version of the program, based on the comparison;

predicting whether the program will be watched live based on the determination; and recording the prediction in the electronic programming guide.

2. The method of claim 1, wherein the determination of whether the program was predominantly watched live is based on a deviation between the first ratio and the average ratio.

3. The method of claim 1, further comprising:
receiving program data comprising the electronic programming guide, wherein the electronic programming guide comprises at least one of indicia of one or more programs watched live, viewership patterns, viewership locations, or viewership audience.

4. A system for predicting whether a program will be watched live comprising:
a tangible computer-readable storage device comprising instructions; and one or more processors coupled to the tangible computer-readable storage device and configured to execute the instructions to perform operations comprising:
receiving, at a server, a plurality of social networking message posts relating to the program in an electronic programming guide;

determining, from the plurality of social networking message posts, a number of live social networking message posts for the program based on a number of social networking message posts relating to the program posted within a first predetermined time frame prior to or during the live playing of the program;

determining, from the plurality of message posts, a number of other social networking message posts for the program based on a number of social networking message posts relating to each program posted within a second predetermined time frame substantially outside of the first predetermined time frame, wherein the second predetermined time frame is after the live playing of the program;

determining a first ratio based on the number of live social networking message posts and the number of other social networking message posts for the program, wherein the number of live or the number of other social networking message posts from a website related to the program are weighted more heavily in the first ratio than the number of live or the number of other social networking message posts from a website unrelated to the program;

storing the first ratio in a memory;

determining an average ratio based on the number of live social networking message posts and the number of other social networking message posts for all programs in the electronic programming guide;

retrieving the first ratio from the memory and comparing the first ratio of the program to the average ratio of all of the programs in the electronic programming guide;

determining whether the program was predominantly watched live, rather than watched as a digital video recorded version or watched as an online streaming recorded version of the program, based on the comparison;

predicting whether the program will be watched live based on the determination; and recording the prediction in the electronic programming guide.

5. The system of claim 4, wherein the determination of whether the program was predominantly watched live is based on a deviation between the first ratio and the average ratio.

* * * * *